US008719126B2

(12) United States Patent
Hall et al.

(10) Patent No.: US 8,719,126 B2
(45) Date of Patent: May 6, 2014

(54) FUNDS COLLECTION TOOLS AND TECHNIQUES

(75) Inventors: Josh Hall, Provo, UT (US); John W. Ogilvie, Salt Lake City, UT (US)

(73) Assignee: John Ogilvie, Salt Lake City, UT (US)

( * ) Notice: Subject to any disclaimer, the term of this patent is extended or adjusted under 35 U.S.C. 154(b) by 995 days.

(21) Appl. No.: 11/261,958

(22) Filed: Oct. 28, 2005

(65) Prior Publication Data
US 2006/0095350 A1 May 4, 2006

Related U.S. Application Data

(60) Provisional application No. 60/624,610, filed on Nov. 2, 2004.

(51) Int. Cl.
*G06Q 40/00* (2012.01)
(52) U.S. Cl.
CPC .................................... *G06Q 40/00* (2013.01)
USPC ........................................................... 705/35
(58) Field of Classification Search
CPC ............................. G06Q 40/001; G06Q 40/123
See application file for complete search history.

(56) References Cited

U.S. PATENT DOCUMENTS

| | | | | |
|---|---|---|---|---|
| 3,944,801 A | * | 3/1976 | Montana | 705/19 |
| 3,946,217 A | * | 3/1976 | Tsujikawa et al. | 705/19 |
| 5,465,206 A | * | 11/1995 | Hilt et al. | 705/40 |
| 5,504,677 A | * | 4/1996 | Pollin | 705/45 |
| 5,644,724 A | * | 7/1997 | Cretzler | 705/19 |
| 6,032,133 A | * | 2/2000 | Hilt et al. | 705/40 |
| 6,078,899 A | * | 6/2000 | Francisco et al. | 705/19 |
| 6,347,304 B1 | * | 2/2002 | Taricani, Jr. | 705/19 |
| 6,456,983 B1 | * | 9/2002 | Keyes et al. | 705/36 R |
| 6,606,606 B2 | * | 8/2003 | Starr | 705/36 R |
| 6,983,261 B1 | * | 1/2006 | Francisco et al. | 705/39 |
| 6,993,502 B1 | * | 1/2006 | Gryglewicz et al. | 705/31 |
| 7,104,443 B1 | * | 9/2006 | Paul et al. | 235/380 |
| 7,188,083 B2 | * | 3/2007 | Agee et al. | 705/31 |
| 7,191,150 B1 | * | 3/2007 | Shao et al. | 705/38 |
| 7,480,626 B1 | * | 1/2009 | Taricani, Jr. | 705/19 |
| 7,505,930 B2 | * | 3/2009 | Senga | 705/26 |
| 2001/0001148 A1 | * | 5/2001 | Martin et al. | 705/39 |
| 2002/0059114 A1 | * | 5/2002 | Cockrill et al. | 705/27 |
| 2002/0065753 A1 | * | 5/2002 | Schloss et al. | 705/35 |
| 2002/0111907 A1 | * | 8/2002 | Ling | 705/41 |
| 2002/0133459 A1 | * | 9/2002 | Polk et al. | 705/40 |
| 2002/0138409 A1 | * | 9/2002 | Bass | 705/38 |
| 2002/0152125 A1 | | 10/2002 | Goedde | |
| 2003/0033245 A1 | * | 2/2003 | Kahr | 705/39 |
| 2003/0055754 A1 | * | 3/2003 | Sullivan | 705/31 |
| 2003/0074290 A1 | | 4/2003 | Clore | 705/35 |
| 2003/0208445 A1 | * | 11/2003 | Compiano | 705/40 |
| 2003/0236755 A1 | * | 12/2003 | Dagelet, Jr. | 705/68 |
| 2004/0030647 A1 | | 2/2004 | Hansen et al. | |
| 2004/0044599 A1 | | 3/2004 | Kepner et al. | |
| 2004/0064405 A1 | | 4/2004 | Weichert et al. | |

(Continued)

*Primary Examiner* — Bruce I Ebersman
(74) *Attorney, Agent, or Firm* — Ogilvie Law Firm

(57) ABSTRACT

Tax collection tools and techniques automatically and electronically separate tax amounts from other funds in a commercial transaction, and divert the collected tax into a holding fund. The holding fund bears income, at little or no risk. Funds collected are tracked, as are their payment due dates, and tax payments are made automatically from the holding fund to tax authorities in a timely manner on behalf of merchants. Income from the holding fund may be distributed among various parties. Collection of debt, whether taxes or otherwise, through automatic incremental billing is also described.

20 Claims, 2 Drawing Sheets

(56) References Cited

U.S. PATENT DOCUMENTS

| | | | |
|---|---|---|---|
| 2004/0073504 A1* | 4/2004 | Bryman et al. | 705/36 |
| 2004/0088248 A1* | 5/2004 | Cutler | 705/38 |
| 2004/0122736 A1* | 6/2004 | Strock et al. | 705/14 |
| 2004/0139003 A1* | 7/2004 | Udiani | 705/39 |
| 2004/0193540 A1* | 9/2004 | Brown et al. | 705/39 |
| 2005/0044042 A1* | 2/2005 | Mendiola et al. | 705/42 |
| 2005/0055290 A1* | 3/2005 | Bross et al. | 705/31 |
| 2005/0055296 A1* | 3/2005 | Hattersley et al. | 705/35 |
| 2005/0119976 A1* | 6/2005 | Taylor et al. | 705/52 |
| 2005/0131805 A1* | 6/2005 | Bross | 705/39 |
| 2005/0165673 A1* | 7/2005 | Brock | 705/38 |
| 2005/0246234 A1* | 11/2005 | Munyon | 705/21 |
| 2006/0074794 A1* | 4/2006 | Nespola, Jr. | 705/38 |

* cited by examiner

FUNDS COLLECTION TOOLS AND TECHNIQUES

RELATED APPLICATIONS

This application incorporates all material in, and claims priority to, U.S. provisional patent application Ser. No. 60/624,610 filed Nov. 2, 2004.

BACKGROUND

Facing billions of dollars in deficits and large gaps between revenues and planned spending, governors, state tax commissioners, and legislative fiscal leaders are seeking ways to raise revenues without raising taxes or slashing vital services. The enormous amount of uncollected taxes represents one area with a potential to significantly reduce the budget gap in many states. Billions of dollars are owed to states, yet many states collect only a small fraction of the actual amount owed. The efficient and correct collection of state debt, and the efficient and correct administration of the entire tax collection system, are worthy goals which may be approached in various ways, some of which are discussed herein. Collection of other debts is also discussed.

SUMMARY

The present invention provides tools and techniques for collection of taxes and/or other funds. In some embodiments, tax collection tools and techniques transform data representing discrete dollar amounts into a tax amount and transfer it, by a machine through a series of calculations into a final tax amount, as a practical application of tax rates and tax calculations, to produce as a useful concrete and tangible result a tax amount which is at least momentarily fixed for recording, reporting, and funds transfer purposes, to be accepted and relied on by regulatory authorities and in subsequent tax payment transactions. This invention does not preempt other uses of tax due calculations.

In some embodiments, one or more unsuccessful attempts to collect a debt do not give way immediately to writing off the debt or sending it to a debt collection service. Instead, automatic retry attempts are made to collect at least part of the debt, incrementally. This may be done in connection with debts incurred in taxable transactions and handled through tax collection as just noted, but it may be used in other contexts as well. Likewise, the tax collection methods and systems may be used with automatic incremental billing, but need not be combined with them in every embodiment.

These examples are merely illustrative. The present invention is defined by the claims, and to the extent this summary conflicts with the claims rather than merely introducing or illustrating them, the claims should prevail.

DRAWINGS

To illustrate the manner in which the advantages and features of the invention are obtained, a description of the present invention is given with reference to the attached drawings. These drawings only illustrate selected aspects of the invention and thus do not fully determine the invention's scope.

DETAILED DESCRIPTION

Introduction

Figure 1:
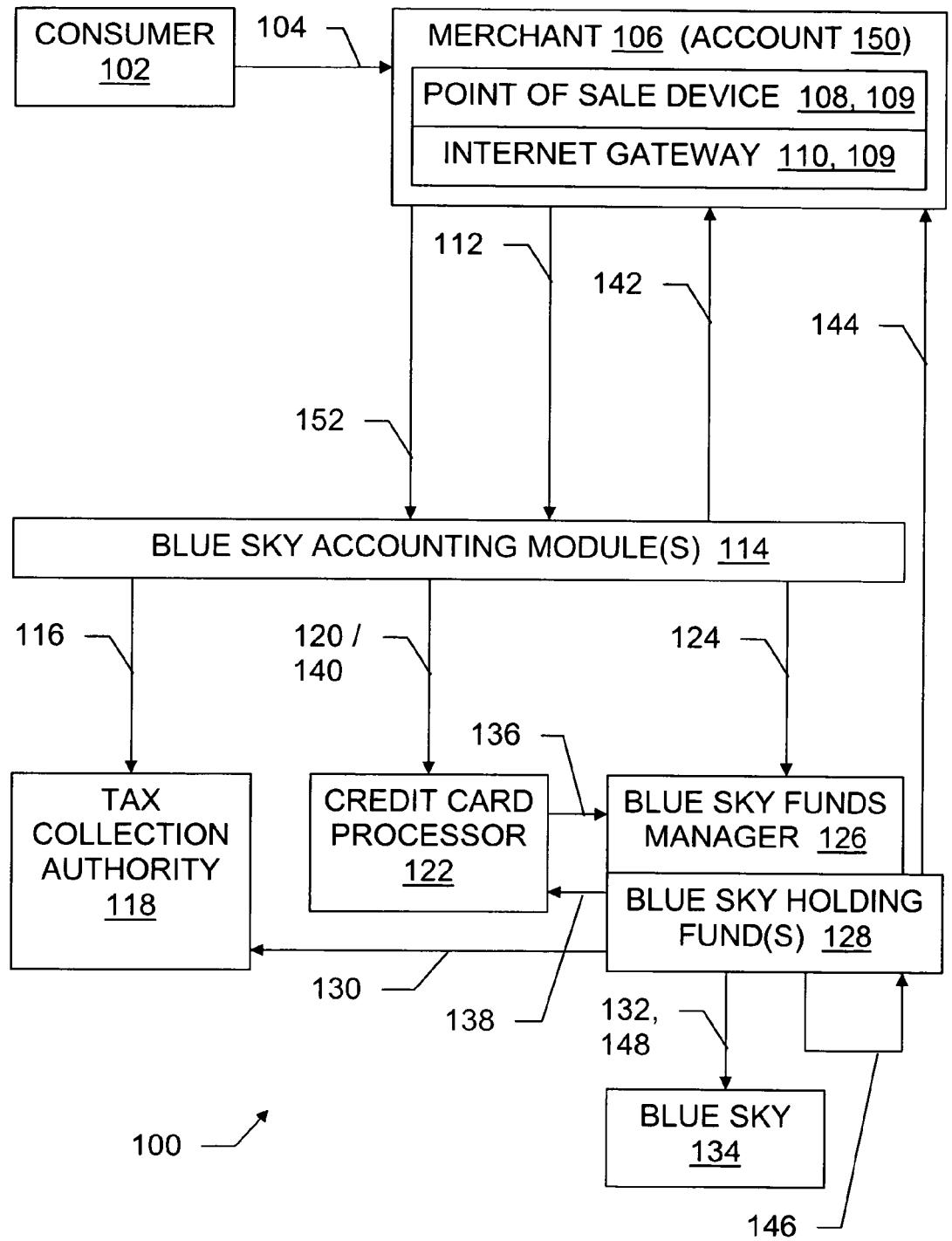
FIG. 1 is a data flow diagram illustrating tax collection roles, information and/or funds flow, systems, methods, and other aspects of some embodiments of the present invention.

The present invention provides tools and techniques to assist in tax collection and/or other debt collection. The invention is illustrated below by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to their own lexicography.

The present tax collection invention, and a hypothetical authorized source of it which permits performance of the inventive method or use of the inventive system under a patent license, are referred to herein using the term "Blue Sky". Blue Sky may aid governments in maximizing their revenue sources, and it may be possible for banks and other credit card processors, merchants and Blue Sky shareholders to exploit this revenue opportunity by implementing these processes and technologies into everyday financial transactions. It may be possible to reduce or to entirely eliminate tax collection and payment costs for merchants, which will allow them to better focus on growing their businesses.

Summary of a Sequential Approach

Aspects of the invention may be implemented in parallel, in sequence, or in some combination thereof. In one sequential approach, there are five objectives including three which are longer term in nature.

First, streamline how sales tax is collected and paid in the current payment environment. Currently, state and local governments are losing hundreds of millions of dollars in unpaid and uncollected sales tax from business owners. Business owners are required to collect the sales tax, keep the money in their bank and then pay it monthly, quarterly, or annually. From the business owner's view, collecting and paying sales tax is a burdensome and time-consuming ritual. Blue Sky technology will electronically pay the sales tax directly to a state government on behalf of the business owner on or shortly before the specified filing date as indicated, e.g., by the business upon opening their processing account. The business owner need not otherwise track or route the sales tax money, thus alleviating concerns of errors, dishonesty, and time restraints. In one embodiment, Blue Sky has the process and technology to make sure that most or all transactions that have sales tax collected and are made through a credit card can have the tax paid on time, every time with no substantial ongoing effort made on the business owner's side.

Second, create a new revenue source for banks and other credit card processors, enhance the amount of tax dollars that are paid to the government and offset costs for merchants by using money that has previously been lost or sitting idly. One purpose may be to instantly or rapidly collect sales tax from a credit card transaction by diverting it from the credit card processor and routing it into a specially designed interest or other income bearing bank fund for a minimum of forty-five days and up to three-hundred-ninety days, for instance. The period funds spend in such holding accounts depends on when they are collected and when they are due to be paid to a tax authority; the longer they spend, the more income they will usually generate, so longer is generally better. Once the tax has been paid by Blue Sky for a merchant, the generated profits will then be collected and distributed to Blue Sky, the credit card processor, and/or the merchant. As an additional revenue source for Blue Sky and before it distributes the original profits, it may re-invest that money back into the same fund (or a riskier fund) for an additional three months with the resulting additional profits going to Blue Sky only.

The way the sales tax collection and payment system stands now, merchants lose money when they pay the sales tax due when the order was placed by a credit card and they are charged the two-to-four percent discount rate on money they don't even get to keep. With the Blue Sky entity's process, merchants can not only offset this cost, but actually make money off the sales tax.

Third, implement Blue Sky sales tax collection technology and processes into collecting taxes on alcohol, tobacco, gasoline, insurance premiums, hunting and fishing, and employer-collected taxes, for example. Blue Sky will be able in principle to collect and pay any type of tax that is collected but not required to be paid for at least some period, e.g., thirty days, possibly with a grace period. As used herein, "merchants" thus include employers that collect taxes for employees, unless otherwise indicated.

Fourth, create a simple, one stop nationwide streamlined sales tax payment system that will collect and pay online sales tax in most or all states. There is a movement in many state governments to get a streamlined tax code and collection method for online retailers. Collecting and paying online sales tax is perhaps not a question of if, but when. State and local governments are losing billions of dollars in lost revenue because of untaxed online purchases. One of the reasons this tax hasn't been legally adopted is because there are few or no technologies that can collect and pay the sales tax for an online merchant in all fifty states and over seven thousand jurisdictions. Blue Sky technology may help provide a simple, one stop, collection and payment center for millions of online retailers.

Fifth, implement software to allow the collection of sales tax made from non-credit-card transactions. A large percentage of transactions are still facilitated by cash only. Therefore, it would be helpful to integrate Blue Sky technology into a semi-stand-alone point of sale terminal that will track all the sales tax collected during a day, batch it, and then have it contact Blue Sky systems in order to electronically withdraw the sales tax out of the merchant's bank account on a daily basis. Blue Sky will then pay the sales tax automatically. With this method, Blue Sky doesn't have to pay a credit card processor, so it is able to pay the merchant a larger amount.

Sales Tax Processing and Investment Fund

FIG. 1 illustrates the entities, information flow, funds flow, and other aspects of some embodiments of the present invention. When a consumer 102 makes 104 a purchase from a merchant 106 using a merchant purchasing component 109 (e.g., an internet gateway 110 or a point of sale 108 credit card processor unit or register), information 112 about the purchase and its tax-jurisdictional context is provided electronically to Blue Sky technology 114. Sales tax rates and other tax rates may be looked up automatically based on location and other information, or they may be provided expressly by the merchant (especially by an employer).

The goods/services purchase price amount is digitally separated from the sales tax amount. In some illustrated embodiments of FIG. 1, the purchase price is sent 120 to the credit card processor 122, and collected tax funds are transferred 124 to a Blue Sky funds manager 136 for placement in one or more holding funds 128. In some alternative embodiments, also illustrated by FIG. 1, the purchase funds and the collected tax are both sent 140 to the credit card processor 122, which then sends 136 the collected tax to the Blue Sky funds manager 136 for placement in one or more holding funds 128. In some embodiments, the credit card processor, or a division or department thereof, serves as the Blue Sky funds manager 136.

At the end of the business day, for instance, the credit card transactions are batched and sent 120/140 to the processor 122. Directing funds 120/140, 136, 124 may occur in response to at least one of: passage of a specified period of time since funds were last so directed, accumulation of undirected funds past a specified threshold amount, execution of a specified number of commercial transactions since funds were last so directed. When the batch reaches the processor, the digitally divided funds are directed to their pending destinations. The product purchase amount goes to the normal processing area as usual and the sales tax and/or other collected tax is sent electronically to a special Blue Sky interest bearing account 128 where it will sit for 45-320 days (for example) before it is paid 130 directly to the corresponding states and/or other tax collection authority 118 on behalf of the collecting merchant 106. Sitting times in the fund(s) 128 may depend on the merchant's filing status, late fees, etc.

The holding funds 128 are special low-to-no risk, high volume interest or other income bearing accounts that will be administered 126 by the credit card processors 122 or Blue Sky 134, depending on the business model selected. As used herein, "low-to-no" risk can be low risk, or no risk. Unless otherwise indicated, "interest" includes interest income, fees generated, and/or other income. A large and reputable federally insured financial institution will be selected to be the direct fund managers 126. This will be a specially negotiated type of account 128 where the account interest payments will be made according to the aggregate fund totals over the specified period and not for the individual deposits made on a daily basis, to reflect that merchants 106 are depositing sales tax payments on a frequent (e.g., hourly or daily) basis.

A possible purpose of this account 128 is that it be a virtual lending pool for the financial institution 126. The financial institution has complete access to this account, but must credibly guarantee reimbursement of any funds that are withdrawn or used for its purposes and guarantee Blue Sky's pre-negotiated interest rates on any funds that are deposited into the account, thus eliminating any risk of loss on the sales tax fund. Blue Sky 134 may solicit financial advice and guidance from talented economists and financial minds in order to determine the best way to set up this account.

In many states, merchants must pay their sales tax quarterly, monthly or yearly, and the actual payment is due fifteen to thirty days after that. Blue Sky's system 100 will track, collect and batch all sales tax collected in a period for the merchant. When their tax retention period is up, Blue Sky software will electronically transfer 130 the collected sales tax from Blue Sky's special fund to the specified state tax commission and/or other authority. Confirmations will then be sent 142 to the merchant.

Every time the sales tax is paid and the merchant's Blue Sky-managed tax account is cleared, the interest that is made from the sales tax deposits for the period will be split according to the particular embodiment. Interest may also be removed sooner, but the taxes themselves should be held in trust until paid to the tax authority. The percentages and/or flat fees paid will be negotiated previous to commencement of processing. In some embodiments, the earned interest is split three ways, with some agreed flat amount or percentage going 144 to the merchant, some going 138 to the credit card processor, and some going 132 to Blue Sky. In some embodiments, none goes to the merchant; instead, the merchant benefits from easier and more reliable tax collections. Indeed, in some embodiments, the merchant pays Blue Sky 134 and/or other parties (the credit card processor 122 and/or funds manager 126) a fee for their tax collection and/or payment services. In some embodiments, transactions look the same to the credit card processor as in the absence of Blue Sky, and none of the interest from the holding funds goes to the credit card processor. In some embodiments, the credit card processor serves as funds manager and/or as Blue Sky, so those interest payment flows are merged accordingly.

As an additional revenue source for Blue Sky, when tax payment deadlines permit, it may collect the initial profits (which are already allotted for distribution) and re-invest 146 them back into the fund(s) 128 for an additional three months, for instance, or for a period of 45-120 days. After this reinvestment period is up, the funds manager 126 will then electronically distribute the initial profits to the credit card processor and the merchant, or as otherwise agreed. Under these embodiments, Blue Sky will get 132 a portion of the initial interest profits and will also receive 148 the entire amount of interest made off of the reinvestment of the initial profits.

As indicated, Blue Sky technology uses account tracking. This may be done using software and/or special purpose hardware and/or software configuring general purpose hardware, in the form of modules located at the merchant point of sale 108, the merchant gateway 110, the credit card processor 122, the holding funds manager 126, Blue Sky 134, and/or the tax collection authority 118. Regardless, every sales tax dollar (or in some embodiments, every cent or whatever unit is legally appropriate) that is pulled from the merchant's gateway/point of sale and deposited into the interest bearing account 128 will be tagged to the merchant's account 150. The software 114 is able to calculate and track how much interest money is generated off of every tax dollar deposited by the merchant. In some embodiments, each merchant has the ability to see in real time or near-real time (e.g., by system updates nightly or hourly) how much sales tax it has collected and to see when tax payments 130 and/or other payments have been made.

During set up, the merchant will give 152 Blue Sky accounting 114 its tax id number, license number, etc. and the corresponding state, agency name, etc. so the merchant's taxes can be paid automatically. In some embodiments, the account module uses this information to register the merchant and/or otherwise communicate 116 with the tax collection authority 118 on the merchant's behalf. To the extent a limited power of attorney, trusteeship, or principal-agent relationship, for instance, is required to allow Blue Sky 134 and/or other entities (credit card processor 122, funds manager 126) to collect, use, and disburse tax funds on behalf of the merchant 106, such legal relationships can be established or confirmed during a set-up phase 152 or as otherwise appropriate.

In some embodiments, the inventive process and/or inventive systems operate as follows; Visa is used here as an example, but other cards and card institutions may participate similarly. A Visa cardholder 102 makes a purchase at a merchant 106. The merchant sends 112 an authorization request to an acquirer bank, at or by which time the purchase price and sales tax are determined by Blue Sky technology 114. The acquirer bank sends an authorization request to Visa, which forwards the request to an issuer bank, which responds to Visa, which forwards the response back to the acquirer bank. The acquirer bank then responds to the merchant, which completes the transaction with the cardholder. In terms of FIG. 1, the acquirer bank, Visa, and the issuer bank provide credit card processing 122. The merchant sends the transaction amount to the acquirer bank, which submits the transaction amount to Visa for settlement. Visa debits the issuer bank and credits the acquirer bank. The acquirer bank credits the merchant and the holding fund 128 for their respective portions, and sends 142 the merchant a receipt for the tax payment. The issuer bank bills the transaction amount on the cardholder's statement. Neither the consumer nor the issuing bank need distinguish (or even know) that the transaction includes separately directed purchase and tax amounts.

Some embodiments include at least two types of holding funds 128, namely, a special tax investment interest bearing account in which funds reside for 20-360 days before being paid to the tax authority 118, and a special pre-payout interest bearing account in which funds reside for 90 days. As in other examples, these numbers are illustrative only, and actual durations are based on when money is received and when it is due to the tax authority. In some embodiments interest is split three ways, between Blue Sky, an acquirer bank, and a merchant.

In some embodiments, no holding fund are present. For instance, some jurisdictions may prohibit private interest-bearing accounts holding collected tax funds. Instead, a sales or other tax and a purchase amount are charged to a consumer together in a transaction at a merchant, and the tax is electronically and promptly transferred to the tax authority. In such embodiments, Blue Sky does not receive profit from the time value of the collected tax, because the tax is not placed in a holding account. However, Blue Sky may receive a percentage or flat service fee, or other consideration, from the merchant for separating the tax from the rest of the transaction and paying the tax on the merchant's behalf. Alternately or in addition, Blue Sky may receive a fee or other consideration from the tax authority in exchange for Blue Sky's assistance in prompt and reliable payment of the tax.

Promptness may be measured in various ways. In a given embodiment, it may require completion of the tax payment within a specified time period, e.g., 1 hour, 24 hours, 2 business days, 10 business days, etc. It may require payment before a specified event, e.g., before the consumer leaves the merchant's web site or store. Or it may simply mean that payment occurs quickly enough to prevent late fees or other regulatory action, but does not take long enough to justify the administrative expense of using a holding fund. Other definitions of promptness which are reasonable to those of skill in the art under the particular circumstances involved may also be used.

Other Excise Tax Collection and Investment Fund

Other large government debt collection areas that may have the same problems and complaints as does sales tax collection and payment are those involving collection of alcohol, tobacco, gasoline, insurance premium taxes, hunting, fishing, or employer taxes. Conventional procedures for most of these is similar or identical to conventional sales tax procedure, namely, the merchant (employer) passes the tax on to the customer (employee) who then pays it when making a purchase (receiving a paycheck). The merchant collects and keeps the tax for a period of time, and the merchant then pays the sales tax manually, or at best perhaps with limited computer assistance, e.g., using an accounting package to track the amount due (with manual data entry) and a calendar program to track deadlines (entered by hand). Blue Sky technology 100 can be used with taxes other than—or in addition to—sales tax, with appropriate changes to the tax accountant module 114 and the receiving authority 118.

Nationwide Sales Tax Collection

An e-commerce tax collection service which is consistent with FIG. 1 for a given participating merchant may help multiple online retailers collect sales tax from every state in which they sell a product and pay that collected sales tax to the corresponding government tax commission or other authorities 118. This is similar to Blue Sky's process model discussed above, but more extensive in reach and scope, in that it involves multiple jurisdictions and/or multiple merchants. A nationwide streamlined tax system could be implemented by state legislatures, with services provided by a Blue Sky investment bank at the hub of the nation's tax collections and payments. One of the previous road blocks to implement a nationwide sales tax, the lack of an efficient collection system, may thus be removed.

State governments, backed by brick and mortar stores, have pressed for sales tax collection by internet retailers, including retailers that sell in multiple states but collect no sales tax. A pressing matter is the loss of billions of dollars of revenue for state governments due to their inability to collect sales tax on transactions that cross state lines. According to a study commissioned by the Institute for State Studies, a non-profit group based in Salt Lake City, Utah, state revenues faced a loss of over $10 billion in uncollected sales taxes on online transactions in 2001. The study indicated that number could balloon to more than $45 billion by 2006. Gary C. Cornia, a professor of public management at BYU's Marriott School of Management and former commissioner of the Utah State Tax Commission says, "This is a matter of great concern. The result of lower sales tax collection is seen in the form of up to 15 percent losses in tax revenues in some states".

Some states are taking action. In North Carolina, Senate Bill 144, introduced by John Kerr (Wayne), co-chairman of the Senate Finance Committee, would take steps to expand efforts to implement a multi-state "Streamlined Sales and Use Tax Agreement." A goal is to provide enough uniformity on a state-by-state basis to make collection and remittance of sales and use taxes convenient for the merchant, wherever located and wherever the goods are shipped.

Blue Sky processes and technologies described herein are specific tools and techniques which may help implement such goals for sales tax collection, and which may be used as well for collecting other taxes.

Marketing and Implementation Details

Blue Sky will not necessarily be a direct to consumer marketer due to the nature of Blue Sky service. Blue Sky technologies will be used behind the scenes in conjunction with already established credit card processing technologies, for example. It will be the responsibility of Blue Sky partners to market Blue Sky services in the credit card processing distribution channels all the way to the end user: the merchant. Blue Sky software may reside in a register at a physical point of sale, a device having a card reader at a physical point of sale, or an internet payment gateway, for instance. Note that all internet payment gateways and point of sale systems may be required by Blue Sky tier one partners to implement this technology in their gateways and point of sale systems, but the actual use may be determined by the merchant. With governmental and legislative approval however, Blue Sky service or some alternative providing financially equivalent results will no longer be optional, but mandatory for the merchants.

One Blue Sky strategy to bring technology and process to the market will be personal, direct and focused on forming partnerships with a small number of large payment processors that facilitate and settle the financial transactions for the majority of financial institutions in the United States. Below is an outline of who Blue Sky aims to form partnerships with, namely, tier one partners such as Visa Net, American Express Corp., MasterCard, Diners Club, and corresponding or similar acquiring banks. Establishing mutually beneficial relationships with these tier one partners will be a priority. Gaining a partnership with one or more of these tier one targets would give Blue Sky access to the millions of merchants who accept their credit cards, which would then result in Blue Sky's technologies processing billions of dollars a year in sales tax collections. This method may result in large investment returns for all parties involved.

If Blue Sky is unsuccessful in attempts to persuade tier one entities, the next level targets offer a much broader range of potential tier two partners that, although not as large, are still main level transaction processing switchboards, but are more independent and flexible. They have their own transaction systems but still can hook into the Visa Net systems, AMEX, and so on, to process for member and non-member financial institutions alike. Examples include Vital, Nova, First Data, Paymentech, Global Payments, First Horizons, Envoy.

If Blue Sky is unable to persuade any tier one or tier two targets into using Blue Sky process and technology, Blue Sky will partner with internet payment gateway providers such as Authorize.net and Verisign to pull the sales tax without even touching any credit card processing technology. The marketing for this service would fall directly on these gateway processors and not on Blue Sky.

In some cases, when payments are due monthly, a merchant may have up to thirty days after the corresponding month deadline to pay. Money may sometimes be made off monthly collection allowances. Money may sometimes be made as service fees for mandatory electronic funds transfers, analogous to or including wire fees. Some states offer up to $50 if payment is made on time. All these are potential revenue sources for Blue Sky and/or other participants.

Some embodiments include receiving 152 an installation request for software and technology 114 from a merchant 106, the software operating to facilitate tax collection as discussed herein. The merchant then inserts their federal tax identification number and other identifying and/or routing numbers 152 into an electronic form sent to Blue Sky, to facilitate automatic tax payment 130 on behalf of the merchant. Such forms may be electronically signed by the merchant to authorize a Blue Sky entity to pay the tax on their behalf. Suitable security, such as HTTPS, SSL, other encryption, authentication through passwords, biometrics, and so on, should be employed, using security tools and techniques known in the art or hereafter developed.

Other factors may also come into play. Blue Sky may be charging a licensing fee to the network processor. Blue Sky may have point of sale terminals or gateways that will handle cash transactions not under the credit card company umbrella. Blue Sky could charge a fee to merchants to lease or purchase the terminal. In this manner, Blue Sky wouldn't be paying the credit card company, so Blue Sky could make more money this way and pay the merchant more.

Every time a credit card is processed, the merchant is losing money by having to pay his normal discount rate even on the sales tax. So the merchant is losing money when it withdraws the money and pays the tax. Blue Sky may charge a fee to pay the tax for the merchant. It may be prudent to implement Blue Sky accounting 114 in casinos, e.g., for gambling, income, alcohol and/or tobacco tax collection. Blue Sky can take insurance premium taxes and gas station fuel pump taxes also, and hunting and fishing licenses and amusement taxes.

In one embodiment, Blue Sky software 114 is licensed to main level processors (or secondary, whichever business model is chosen) and they install it in their system and require that all payment gateways integrate Blue Sky code 114 into their gateways; then the merchants 106 are able to download the new version. A merchant's website receives an order and the tax amount is automatically routed to a Blue Sky special banking account 128 as the product price amount is routed to the credit card processor's normal accounts for processing. Sales tax is held in a Blue Sky special investment account 128 to accrue interest. On the scheduled date, the merchant's corresponding sales tax amount is removed from the interest-bearing account 128 and sent electronically to the tax commission 118 of the merchant's corresponding state. On the scheduled date, the interest made from the investment account is distributed electronically to the merchant, the credit card processor and Blue Sky according to the predetermined percent or flat fee payout.

When a merchant 196 has an in-store or telephone order and is using a terminal 108 configured for Blue Sky accounting, they would first enter in the actual product price alone, and then enter in the sales tax amount. When they batch all the transactions for the day, all of the product purchase amounts are then transferred in the normal fashion and to the normal processing channels. However, when the batch is executed, the sales tax amount is diverted to the special interest bearing account as discussed herein.

When using an automatic internet payment gateway that is connected to their shopping cart, the product price amounts and the sales tax amounts are automatically separated and upon batch settlement each day they go to their respective account as indicated above. In some embodiments, the sales tax is automatically calculated based on the transaction's location, e.g., by examining the IP address, shipping address, domain name, and/or other information about a buyer to determine the buyer's geographic location and then looking up the applicable sales tax rate in a table.

Blue Sky may want to become its own Internet Gateway (analogous perhaps to Authorize.net) and/or a point of sale terminal distributor, to reduce interface and development time required to implement a system such as system 100. A Blue Sky internet gateway 110 would already have the code 114 built in and be ready to go when the merchant signs up for gateway services. Blue Sky point of sale terminals 108 could be similar mechanically to ones currently offered, but could be offered under a private label and would have Blue Sky functionality installed, e.g., authorized manufacturers could pre-install Blue Sky code 114 in the terminals.

Revenue opportunities may vary, according to the embodiment, the applicable law, and so on. Possibilities include licensing fees paid to Blue Sky from the credit card processors; percentages of the interest that is made from the sales tax deposits; and others described herein.

Unless otherwise indicated, reference herein to "credit card" transactions also covers or refers specifically to debit cards, gift cards, checking accounts, savings accounts, PayPal accounts, and other funds sources/destinations.

Automatic Billing

A system or method using automatic billing for subscriptions and for automatically renewing services can have difficulty collecting payment because of debit cards, bank accounts, or other fund sources not having enough money in the account, or because credit cards are maxed out on the set day of billing. Companies often have their billing software set to retry automatically at most once or twice. A small business may rely on recharging the cards by hand, but this can require an overwhelming amount of time. Sometimes consumers who don't want to pay a company withdraw enough money out of their accounts so the debit or charge transaction doesn't go through. The company never gets its money, even if the consumer redeposits funds the following day.

Figure 2:
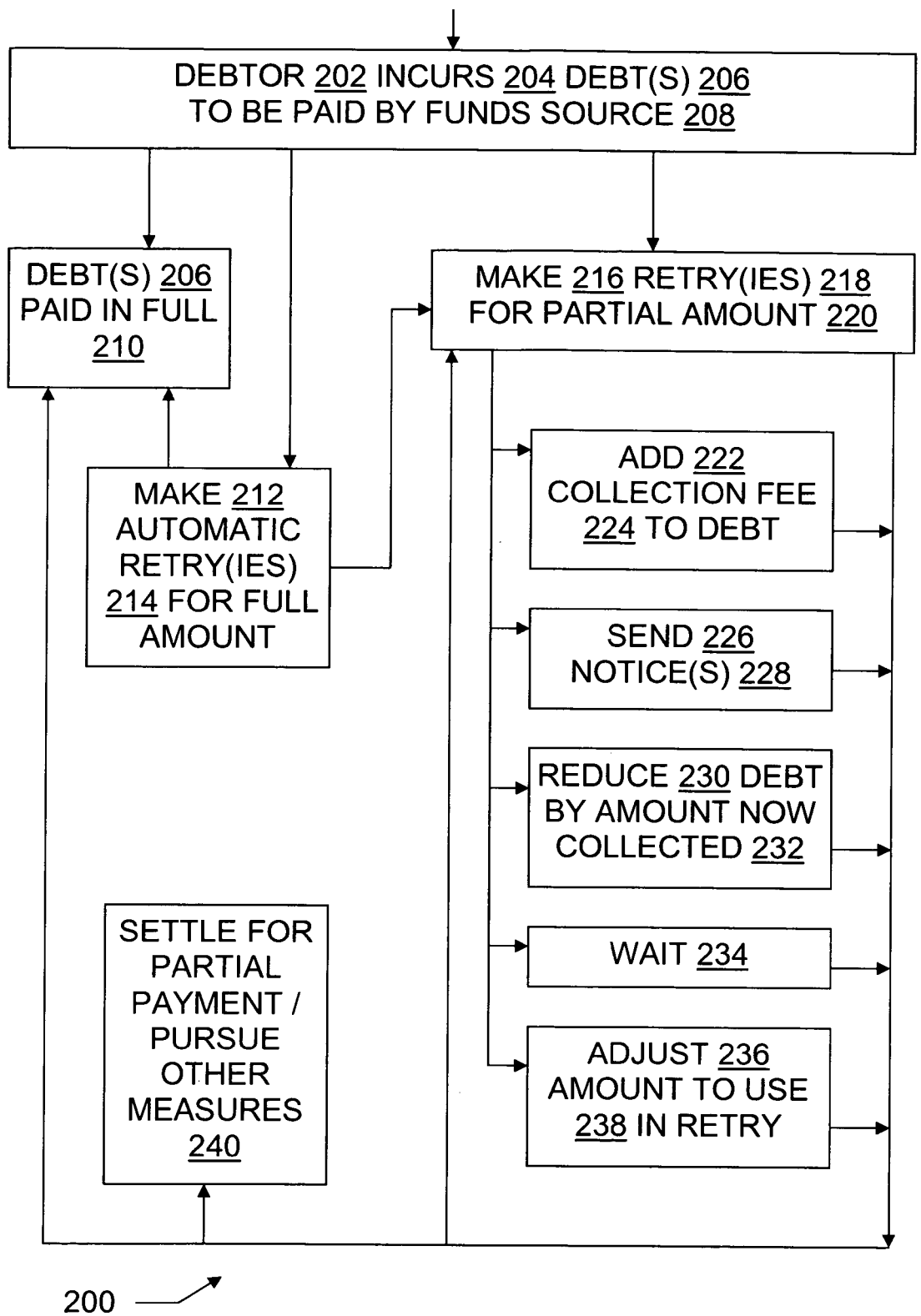
FIG. 2 is a data flow diagram illustrating incremental debt collection roles, information and/or funds flow, systems, methods, and other aspects of some embodiments of the present invention.

One approach to reducing or ending such problems is illustrated in FIG. 2. A system and/or method 200 for automatic incremental billing uses utility/software technology that sends declined charges into a special pool, where inventive technology recharges the card (or other funds source) at lower amount 220 intervals every day until the complete charge is fulfilled. Charges and recharges follow appropriate rules, e.g., applicable law and Visa's charging rules. This approach may allow some or full payment to the merchant even when a card or other source doesn't have enough funds at the time of the automatic charge to pay the merchant in full, regardless of whether that deficiency was accidental or was intended to avoid the automatic charge. This approach to collecting from consumers may be used in conjunction with the tax collection tools and techniques described herein, or separately from them.

In some embodiments, a debtor 202, such as a consumer 102, incurs 204 one or more debts 206. These may be, for instance, payment obligations for the purchase price and sales tax on the purchase, when the consumer buys something at a physical point of sale 108 or online 110. Debt may also be incurred 204 in contexts not involving the tax collection system 100, such as for purchases from merchants that do not employ a system or method like those illustrated in FIG. 1. Regardless, the debts are to be paid by a funds source 208 (credit card, checking account, debit card, etc.) which is agreed to by the debtor.

In some cases the funds source pays the full amount 210, and retries according to the present invention are not needed (but tax collection per FIG. 1 may still be employed). In other cases, a conventional automatic retry 214 seeking 212 the entire amount 210 succeeds, so retries according to the present invention are again not needed (again, tax collection per FIG. 1 may still be employed).

But in other cases, no automatic retries for the full amount are made, or such retries are unsuccessful. Then the illustrated invention 200 makes 216 one or more retries 218 for one or more partial amounts 220 which are individually (and perhaps collectively) lower than the entire amount of the debt. Such retries for a given debt may collectively garner the full debt, or more than the debt (the debt plus a collection fee 224), or they may garner less than the full debt, which is still better than nothing since the effort required by the merchant is small.

A given retry 218 (first or subsequent) may collect enough that the creditor is satisfied to settle 240 for the collected amount. If not, the debt 206 is reduced 230 by the amount collected 232 by the retry. The debt may also be increased 222 by a collection fee 224.

A given embodiment may wait 234 a set period, e.g., 12 hours, 1 day, 3 business days, 1 week, 1 month, before retrying 216 for the remaining amount or a portion thereof, in a given situation. The waiting period may be fixed, or it may depend on the amount remaining, the type funds source 208, the time of year, and/or other factors, as determined empirically or by heuristic or simulation to be appropriate and desirable. In some embodiments, the wait period is smaller or is the minimal required by the credit card processor/bank if an immediately previous retry succeeded in obtaining a partial payment. In some embodiments, the wait period is longer if the amount remaining in the debt exceeds a threshold debt write-off value and the reporting period for debt write-offs is long. In some embodiments, if the funds source is a credit card then the waiting period is short (days or hours) and if it is a debit card then the wait is long (weeks, months). In some embodiments, the wait period is increased during those times of year that are relatively busy for credit card processors, e.g., November, December, January. As noted, other heuristics and guidelines may also be used to set the waiting period. Heuristics and empirical results may also be used to set 216, 236 retry amounts.

In some embodiments, retries are performed at intervals on a predetermined schedule until one of the following occurs: the complete total charge is paid, a maximum time for retries has passed, a maximum number of retries has been made. Such maximums may be set by applicable law, by the funds source institution, or by the embodiment 200 (either as an embedded default value or expressly by a user). Increasingly lower amounts are tried in some situations and embodiments, while in others, the retry amount may stay the same, may increase 236, or may simply vary 236 over time, relative to earlier retries. Note that "retry" is used for convenience to refer to an attempt to collect a smaller amount (in this instance) than the full debt even if no automatic retries were made seeking the full debt in a given instance.

Some consumer protection laws mandate notices 228 to consumers; these may be sent 226 automatically, through email, generated postal mail, generated recorded/synthesized speech phone messages, generated faxes, or the like. The amount 238 to use on the next retry may be determined 236 in various ways. It may be the total remaining, being tried quickly once any amount is collected on the theory that the funds were intentionally removed and have now been restored. It may be a small amount, on the theory that only small amounts have become available in the source 208, as when a fraudulent consumer wants to make use of their funds source without putting enough in it to cover the full debt.

One embodiment of the system 100 distinguishes 114 between payments owed by a consumer and funds actually collected from or on behalf of the consumer 102. Funds actually collected correspond to those collected by retries 218, or those paid in full 210. Sales tax is then diverted to the holding fund 128 according to the amount actually collected by or for the merchant 106, not according to the face value of the purchase made by the consumer 102. In this way, merchants need not inadvertently pay sales tax on sales for which they are not actually paid.

Conclusion

The invention is illustrated above by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

As used herein, terms such as "a" and "the" and designations such as "module" and "distributing" are inclusive of one or more of the indicated item or step. In particular, in the claims a reference to an item generally means at least one such item is present and a reference to a step means at least one instance of the step is performed. "Relying on" an act or step means either performing it or making use of a result of it while or after it is performed by another entity. "Automatically" means possibly permitting manual human override but capable of proceeding without it. "Electronically" means using at least one of: a computer processor, software, computing hardware, a telephone network, a computer network, another electronic device or system. Headings are for convenience only, in the sense that information on a given topic may sometimes be found outside the section whose heading indicates that topic. All claims as filed are part of the specification and thus help describe the invention, and repeated claim language may be inserted outside the claims.

The above embodiments are merely illustrative of the principles of the present invention. Numerous modifications and alternative embodiments can be devised without departing from the spirit and scope of the invention.

We claim:

1. A funds collection system, comprising:
an automatic incremental billing computer system configured to perform automatic attempts to collect payment from a consumer for a charge from at least one credit card transaction by the consumer, by recharging a credit card of the consumer at automatically determined amounts which are lower than the charge, while following credit card charging rules which are in effect at a time of the credit card transaction and thereby avoiding renegotiating the charge or a payment plan with the consumer; and
an accounting module with software and computing hardware comprising a computer processor, the accounting module configured to digitally receive credit card transaction data sent electronically from a card reader and to automatically separate a sales tax amount from a purchase amount owed to a merchant by a consumer, by using the credit card transaction data, wherein the accounting module is configured to separate a sales tax amount from a purchase amount which has been actually collected by using the automatic incremental billing computer system;
wherein the system is configured to manage funds as follows: to provide a transfer of sales tax funds to a sales tax holding account, to a sales tax collection authority, or to both, wherein the sales tax holding account is an interest-bearing account which holds sales tax funds prior to transfer of said sales tax funds to the sales tax collection authority in response to execution of a specified number greater than one of credit card transactions since sales tax funds were last so transferred, wherein the accounting module is configured to track re-investment of interest back into the sales tax holding account, and at least a portion of profits from the interest-bearing account are re-invested for a period which is in a range of 45-120 days, and wherein the automatic incremental billing system uses at least two different wait periods, including a first wait period between retries to collect and a second wait period between retries to collect, and wherein the first wait period is used for a transaction which occurred in November, December, or January, and the second wait period is used for a transaction which did not occur in November, December, or January.

2. The system of claim 1, wherein sales tax funds are transferred by the system to the sales tax holding account within two business days of being digitally separated from the purchase amount.

3. The system of claim 2, wherein the accounting module is configured to track tax amounts in the sales tax holding account for a specified merchant.

4. The system of claim 1, wherein the accounting module is configured to automatically calculate the sales tax amount based on a transaction's location, namely, the card reader's location.

5. The system of claim 1, wherein the automatic incremental billing system is configured to perform automatic attempts to collect payment using a sequence of increasingly lower amounts.

6. The system of claim 1, wherein the accounting module is configured to track at least two types of holding funds, namely, a tax investment interest bearing account in which funds reside for at least 20 days before being paid to the tax authority, and a pre-payout interest bearing account in which funds reside for at least 90 days.

7. The system of claim 1, wherein the accounting module is configured to register the merchant with the sales tax collection authority.

8. The system of claim 1, wherein the accounting module is configured to transfer funds from the sales tax holding account to a sales tax collection authority at least in response to accumulation of undirected funds past a specified threshold amount.

9. The system of claim 1, wherein the system is configured to transfer the sales tax amount to the sales tax collection authority at least ten business days after the sales tax amount is separated.

10. The system of claim 1, wherein the automatic incremental billing system uses a first wait period between retries to collect when a credit card was used in the transaction and uses a second different wait period between retries when a debit card was used in the transaction.

11. The system of claim 1, wherein the automatic incremental billing system uses at least three different wait periods.

12. A point of sale tax collection system, comprising:
an internet gateway for credit card transactions;
an automatic incremental billing computer system configured to perform automatic attempts to collect payment from a consumer for a charge from at least one credit card transaction by the consumer, by recharging a credit card of the consumer at automatically determined amounts which are lower than the charge, while following credit card charging rules which are in effect at a time of the credit card transaction and thereby avoiding renegotiating the charge or a payment plan with the consumer; and
an accounting module with software and computing hardware comprising a computer processor, the accounting module configured to digitally receive credit card transaction data sent electronically from the internet gateway and to automatically separate a sales tax amount from a purchase amount using the credit card transaction data, wherein the accounting module is configured to separate a sales tax amount from a purchase amount which has been actually collected by using the automatic incremental billing computer system;
wherein the system is configured to provide a transfer of sales tax funds to a sales tax collection authority, to a sales tax holding account, or to both, in response to execution of a specified number greater than one of credit card transactions since sales tax funds were last so transferred, wherein the sales tax holding account is an interest-bearing account which holds sales tax funds prior to transfer of said sales tax funds to the sales tax collection authority, wherein the accounting module is configured to track re-investment of interest back into the sales tax holding account, and at least a portion of profits from the interest-bearing account are re-invested for a period which is in a range of 45-120 days, and wherein the automatic incremental billing system uses at least two different wait periods, including a first wait period between retries to collect and a second wait period between retries to collect, and wherein the first wait period is used for a transaction which occurred in November, December, or January, and the second wait period is used for a transaction which did not occur in November, December, or January.

13. The system of claim 12, further comprising a memory configured by sale tax rates based on location, in a look up communication with the accounting module.

14. The system of claim 12, wherein sales tax funds are transferred by the system to the sales tax holding account, and the accounting module is configured to track how much interest money is generated from tax amounts deposited in the sales tax holding account for a specified merchant.

15. The system of claim 12, wherein the automatic incremental billing system is configured to perform automatic attempts to collect payment using a sequence of increasingly lower amounts.

16. The system of claim 12, wherein the accounting module is configured to register a merchant with a sales tax collection authority.

17. The system of claim 12, wherein the accounting module is configured to transfer funds from the sales tax holding account to a sales tax collection authority at least in response to accumulation of undirected funds past a specified threshold amount.

18. The system of claim 12, wherein the system is configured to transfer the sales tax amount to a sales tax collection authority at least two business days after the sales tax amount is separated.

19. The system of claim 12, wherein the system is configured to provide a transfer of sales tax funds to a sales tax collection authority.

20. The system of claim 12, wherein the system is configured to track a service fee which is based on separating the sales tax amount from the purchase amount and on providing the transfer of the sales tax funds to the sales tax collection authority.

* * * * *